(12) United States Patent
Rangarajan et al.

(10) Patent No.: US 8,255,375 B2
(45) Date of Patent: Aug. 28, 2012

(54) CONTENT SERVICE BUS FRAMEWORK

(75) Inventors: Anuradha Rangarajan, Harvard, IL (US); Margie Skiljan, St. Louis, MO (US); Tim M. Edwards, Matthews, NC (US); Davindar Gill, Palatine, IL (US); Peter K. Buchhop, Cary, IL (US)

(73) Assignee: Bank of America Corporation, Charlotte, NC (US)

( * ) Notice: Subject to any disclaimer, the term of this patent is extended or adjusted under 35 U.S.C. 154(b) by 228 days.

(21) Appl. No.: 12/710,712

(22) Filed: Feb. 23, 2010

(65) Prior Publication Data

US 2011/0208706 A1 Aug. 25, 2011

(51) Int. Cl.
*G06F 17/30* (2006.01)
(52) U.S. Cl. ...................................... 707/705
(58) Field of Classification Search .................. 707/694, 707/705, 999.001, 999.01
See application file for complete search history.

(56) References Cited

U.S. PATENT DOCUMENTS

| | | | |
|---|---|---|---|
| 6,473,794 B1 | 10/2002 | Guheen et al. | |
| 6,542,972 B2 * | 4/2003 | Ignatius et al. | 711/154 |
| 7,505,978 B2 | 3/2009 | Bodin et al. | |
| 2004/0107125 A1 | 6/2004 | Guheen et al. | |
| 2005/0021713 A1 | 1/2005 | Dugan et al. | |
| 2005/0165754 A1 * | 7/2005 | Valliappan et al. | 707/3 |
| 2007/0192327 A1 | 8/2007 | Bodin et al. | |
| 2007/0192674 A1 | 8/2007 | Bodin et al. | |
| 2007/0192683 A1 | 8/2007 | Bodin et al. | |
| 2007/0192684 A1 | 8/2007 | Bodin et al. | |
| 2007/0214148 A1 | 9/2007 | Bodin et al. | |
| 2010/0211694 A1 * | 8/2010 | Razmov et al. | 709/242 |
| 2010/0269146 A1 | 10/2010 | Britt et al. | |

OTHER PUBLICATIONS

International Search Report from related PCT Application No. PCT/US11/25610, mailed Apr. 14, 2011, pp. 1-2.

* cited by examiner

*Primary Examiner* — Thu-Nguyet Le
(74) *Attorney, Agent, or Firm* — Banner & Witcoff, Ltd; Michael A. Springs

(57) ABSTRACT

Electronic content is routed and stored within an enterprise, in which a distributed service-oriented architecture platform is provided to seamlessly route and store content to heterogeneous enterprise content repositories. Dynamic content may be stored, retrieved and queried in real-time through a content service bus (CSB), thus eliminating the need to have point-to-point connectivity between client applications and the destination repositories, while supporting the flexibility to consolidate multiple platforms with minimal impacts to clients. The CSB framework may incorporate underlying technologies, including Web services, intelligent routing based on content, message transformation, and federation of content. A request may be routed to the appropriate content repository based on attached content or metadata in the request and transformed by the CSB to a format required by the determined content repository. The requestor is subsequently provided a response from the content repository in a consistent manner for all of the content repositories.

22 Claims, 11 Drawing Sheets

CONTENT SERVICE BUS FRAMEWORK

FIELD

Aspects of the embodiments generally relate to a computer system seamlessly routing and storing electronic content on a plurality of heterogeneous content repositories. In particular, dynamic, on-line content may be stored, retrieved, and queried in real-time through a content service bus without having point-to-point connectivity between client applications and destination content repositories.

BACKGROUND

The last decade (2000-2009) has seen many mergers and acquisitions (M&As) in numerous business sectors. While many M&As are not at the same monetary level as the top ten M&As, large amounts of shareholder's money are nevertheless at risk. Needless to say, some of the M&A's may be considered as unqualified successes while some have been dismal failures.

The business case for a merger or acquisition is typically predicated on cost savings based on the belief that the whole is greater than the sum of its parts. For example, operations of merged companies are often combined to obtain greater efficiencies in overall operations. However, the operations of component companies before a merger or acquisition are disparate so that integrating operations is difficult. For example, with multiple acquisitions made by a bank, the content (electronic documents) may reside in multiple repositories from several vendors that need to be migrated or integrated to/with the acquiring bank. Consequently, facilitating the integration of operations of merged and acquired companies is important to insure that a M&A is successful.

BRIEF SUMMARY

Aspects of the embodiments address one or more of the issues mentioned above by disclosing methods, computer readable media, and apparatuses in which electronic content is routed and stored within an enterprise. With an aspect of the embodiments, a highly distributed service-oriented architecture (SOA) platform is provided to seamlessly route and store content to heterogeneous enterprise content management (ECM) repositories. Dynamic, on-line content may be stored, retrieved, and queried in real-time through a content service bus (CSB). This approach may eliminate the need to have point-to-point connectivity between ECM client applications and destination content repositories, while supporting the flexibility to consolidate multiple ECM platforms with minimal impacts to clients. The CSB framework may incorporate underlying technologies, including Web services, intelligent routing based on content, message transformation, and federation of content.

With another aspect of the embodiments, a request is received by the content service bus from a requestor to access electronic content without an explicit repository identification in the request, where the electronic content is associated with one of a plurality of content repositories and where at least two content repositories have different types of data interfaces. The request is then routed by the content service bus to the appropriate content repository based on attached content or metadata in the request. The request is transformed by the content service bus to a format required by the determined content repository. The requestor is subsequently provided a response from the content repository in a consistent manner for all of the content repositories.

With another aspect of the embodiments, usage is monitored for a requestor in real-time by a content service bus in order to enforce the usage based on a service level agreement. The usage may be projected for a desired time period. When the projected usage exceeds a limit specified by the service level agreement, the content service bus may reject or throttle the request.

With another aspect of the embodiments, content from a legacy content repository may be migrated to a target content repository, e.g., a centralized content repository. A content service bus provides a consistent interface to the requestor after the migration as before the migration.

Aspects of the embodiments may be provided in a computer-readable medium having computer-executable instructions to perform one or more of the process steps described herein.

These and other aspects of the embodiments are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
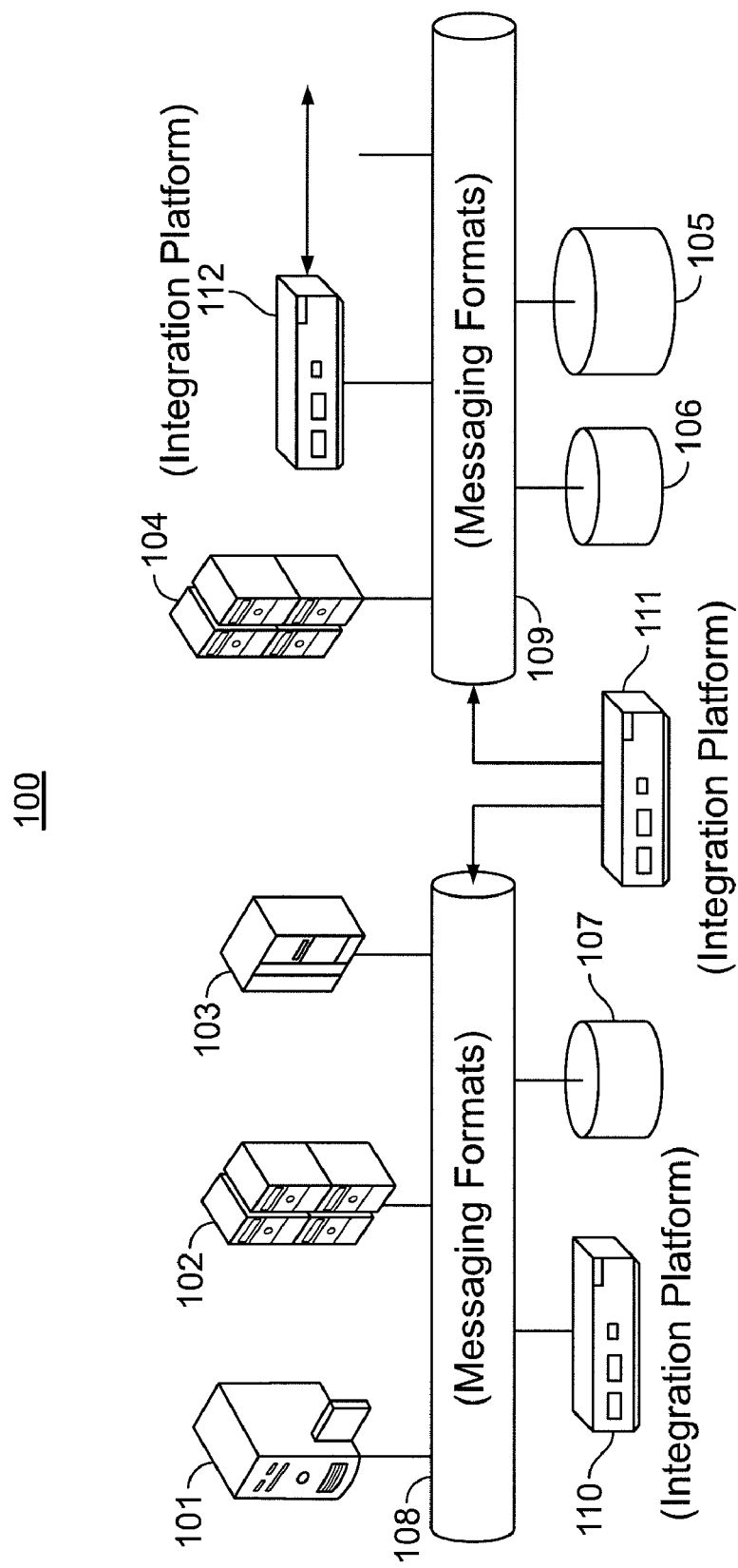
FIG. 1 shows an enterprise computing system in accordance with various aspects of the embodiments.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

In the description herein, the following terms are referenced.

Metadata: "Data about data" of any sort in any media. An item of metadata may describe an individual datum, content item, or a collection of data including multiple content items and hierarchical levels, e.g., a database schema. With data processing, metadata is typically definitional data that provides information about or documentation of other data managed within an application or environment.

User (requestor): An entity that interacts with the content service bus (CSB). For example, an end-user may interact with the CSB through a user-facing application layer or a software application may interact with the CSB through a middleware layer. In the above examples, a "user" or a "requestor" may be a software application layer or middleware layer. A front-end process may further interface with an end-user so that the end-user can enter commands to initiate requests through the application layer or middleware layer to content repositories.

In accordance with various aspects of the embodiments, methods, computer-readable media, and apparatuses are disclosed to route and store electronic content within an enterprise. With an aspect of the embodiments, a highly distributed service-oriented architecture (SOA) platform is provided to seamlessly route and store content to heterogeneous enterprise content management (ECM) repositories. Dynamic, on-line content may be stored, retrieved, and queried in real-time through the content service bus (CSB). This approach may eliminate the need to have point-to-point connectivity between ECM client applications and destination repositories, while supporting the flexibility to consolidate multiple ECM platforms with minimal impacts to clients. The CSB framework may incorporate underlying technologies, including Web services, intelligent routing based on content, message transformation, and federation of content.

In an illustrative scenario for some of the embodiments, an acquiring financial institution acquires another financial institution holding a portfolio of home mortgage loans. Electronic records of the home mortgage loans are stored on an existing mortgage loan content repository (e.g., a database). With the acquisition, the acquiring financial institution integrates the mortgage loan repository into its enterprise system. However, the mortgage content repository may be based on a vendor-specific interface, which is not currently supported by the enterprise system. As will be discussed, a content service bus enables to the enterprise system to interface with the home mortgage loan repository to a user without the user having a direct connection to the content repository. As will be further discussed, if a user sends a request to access content for one of the mortgages in the mortgage portfolio, the content service bus can determine from data (e.g., metadata associated with the content) contained in the request that the request should be routed to the mortgage loan content repository and not some other content repository. Content on the home loan repository may be subsequently migrated to a centralized enterprise content repository so that the migration is transparent to the user.

FIG. 1 shows an enterprise computing system 100 in accordance with various aspects of the embodiments. Computing devices 101-104 may access electronic content from content repositories 105, 106, or 107, through a content service bus. Access of electronic content may include retrieving electronic content from a content repository, storing electronic content at the content repository, or querying the content repository about electronic content. As illustrated in FIG. 1, the content bus may include one or more messaging networks (e.g., messaging and queuing networks 108 and 109) and one or more integration platforms (e.g., integration platforms 110, 111, and 112). As will be further discussed, a content service bus provides a common business interface to a user even though content repositories may utilize different proprietary interfaces. For example, a bank may acquire different financial institutions, where content (electronic documents) reside in multiple content repositories from several vendors that need to be migrated or integrated to/with the acquiring bank's computing systems. In accordance with traditional systems, enterprise content management (ECM) systems may be monolithic in nature and support a single back end repository.

With some embodiments, messaging networks 108 and 109 comprise of various messaging networks. Integration platform 110, 111, or 112 may be a computer system specifically designed to lower the cost of integrating computer systems. Integration platforms 110, 111, 112 may send or receive electronic messages from other computers that are exchanging electronic documents. If integration platforms 110, 111, and 112 support eXtensible Markup Language (XML) messaging standards, the platforms are frequently referred to as XML appliances.

With some embodiments, integration platforms 110, 111 and 112 may provide a hardware platform for delivering manageable, secure, and scalable integration solutions. Integration platforms 110, 111, and 112 may provide fast and flexible application integration with declarative any-to-any transformations between disparate message formats and may enable reliability by securing services at the network layer with advanced services processing and policy enforcement.

Integration platforms 110, 111, and 112 may incorporate enterprise service bus (ESB) technology to deliver common message transformation, integration, and routing functions for computing devices 101-104 and content repositories 105, 106, and 107. Integration platforms 110, 111, and 112 may provide transport-independent, transformations between binary, flat text files, and XML message formats. Visual tools may be used to describe data formats, create mappings between different formats, and define message choreography. Integration platforms 110, 111, and 112 may also transform binary, flat text, and other non-XML messages to help offer a solution for security-rich XML enablement, ESBs, and mainframe connectivity.

Integration platforms 110, 111, and 112 may support a wide array of transport protocols and may be capable of bridging request and response flows to and from protocols such as HTTP, HTTPS, MQ, SSL, IMS Connect, and FTP. Integrated platforms 110, 111, and 112 may also filter, validated, encrypt, and sign messages, helping to provide more secure enablement of high-value applications.

Figure 2:
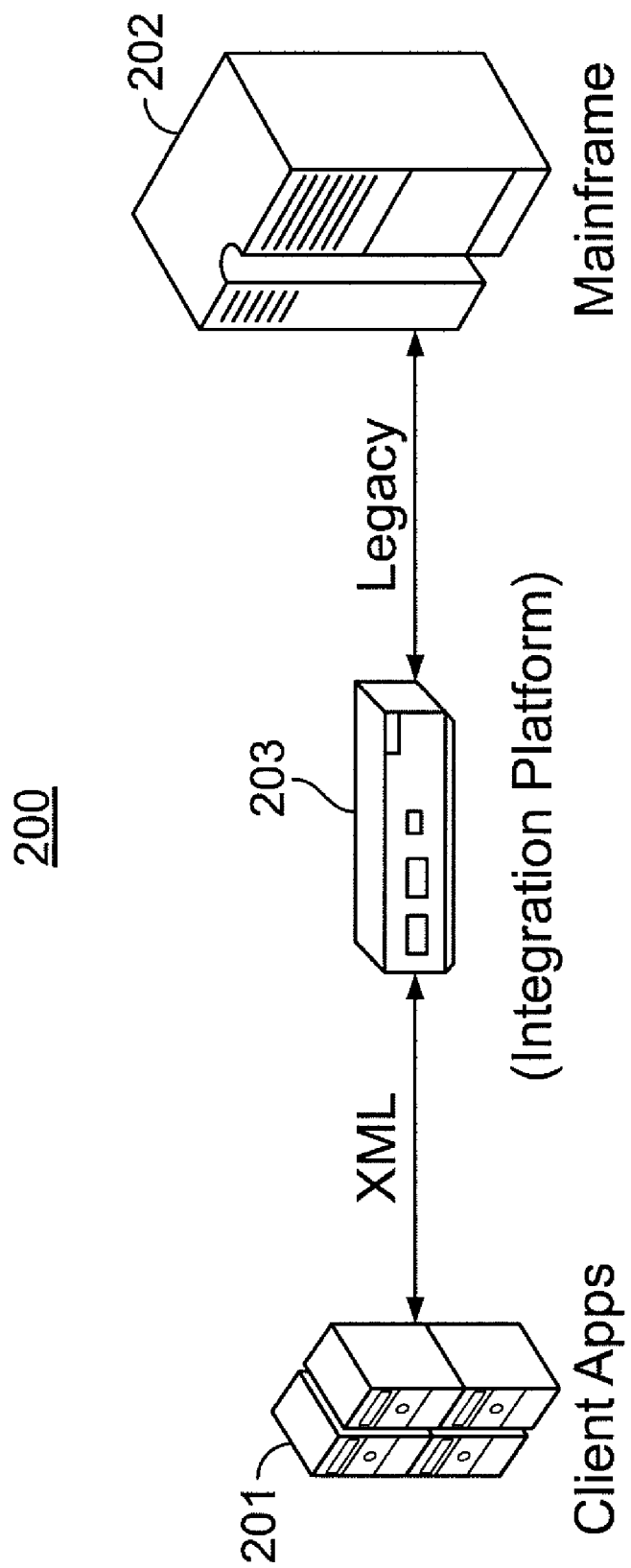
FIG. 2 shows an integrated mainframe computing configuration in accordance with various aspects of the embodiments.

FIG. 2 shows an integrated mainframe computing configuration 200 in accordance with various aspects of the embodiments. Integration platform 203 may be used to off-load XSLT processing, XPath routing, legacy-XML conversion, and other resource-intensive tasks between client applications 201 and mainframe 202 to reduce latency, improve throughput, and free up compute resources. Integration platform 203 may also protect and XML-enable mainframe systems, so that mainframe 202 may be connected through enterprise services.

Figure 3:
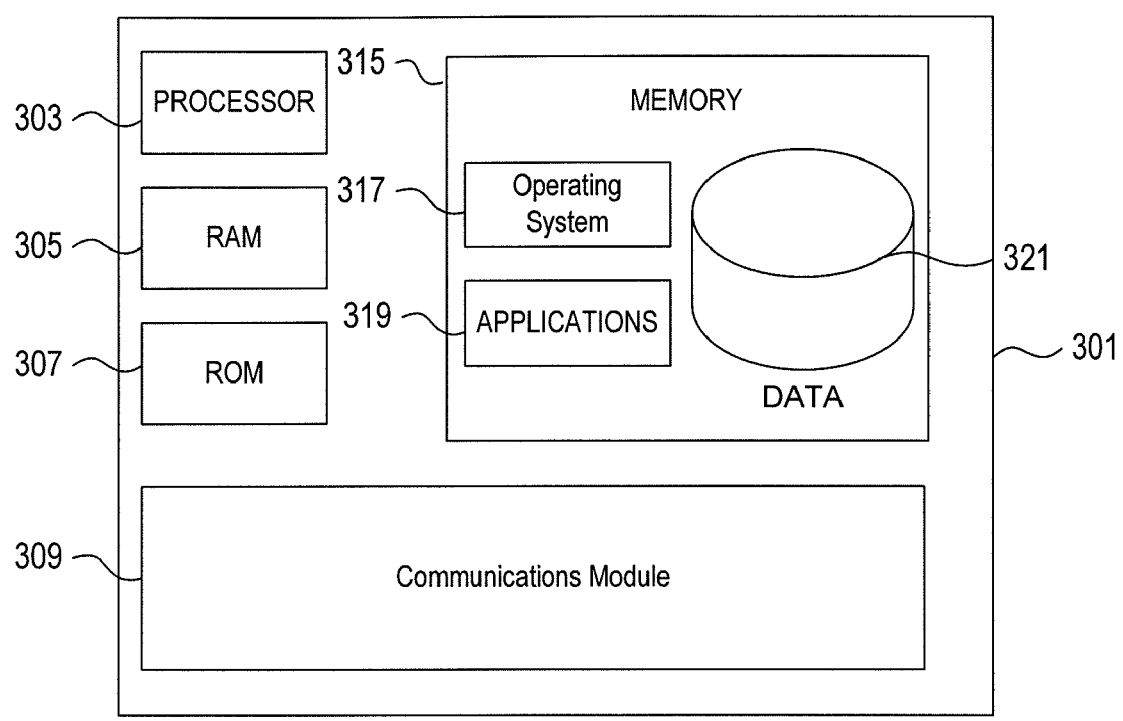
FIG. 3 shows an illustrative operating environment in which various aspects of the embodiments may be implemented.

FIG. 3 illustrates an example of a computing platform 301 for supporting an enterprise service bus that may be used according to one or more illustrative embodiments. Computing platform 301 is only one example of a suitable computing environment and is not intended to suggest any limitation as to the scope of use or functionality of the embodiments. Computing platform 301 should not be interpreted as having any dependency or requirement relating to any one or combination of components shown in the illustrative computing platform 301.

The embodiments are operational with numerous other general purpose or special purpose computing system environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Computing platform 301 may have a processor 303 for controlling overall operation of the computing platform 301 and its associated components, including RAM 305, ROM 307, communications module 309, and memory 315. Computing platform 301 typically includes a variety of computer readable media. Computer readable media may be any available media that may be accessed by computing platform 301 and include both volatile and nonvolatile media, removable, and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 301.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 305 may include one or more are applications representing the application data stored in RAM memory 305 while the computing device is on and corresponding software applications (e.g., software tasks), are running on the computing platform 301.

Communications module 309 may include an interface to communicate with a message bus, e.g., message bus 107 or message bus 108 as shown in FIG. 1. Embodiments may support messaging networks 107 and 108.

Software may be stored within memory 315 and/or storage to provide instructions to processor 303 for enabling computing platform 301 to perform various functions, e.g., processes 600-1100 as shown in FIG. 6-11, respectively. For example, memory 315 may store software used by computing platform 301, such as an operating system 317, application programs 319, and an associated database 321. Alternatively, some or all of the computer executable instructions for computing platform 301 may be embodied in hardware or firmware (not explicitly shown).

Database 321 may provide storage of electronic content for a business enterprise. While database 321 is shown to be internal to computing platform 301, database 321 may be external to computing platform 301 with some embodiments.

Embodiments of the invention may include forms of computer-readable media. Computer-readable media include any available media that can be accessed by a computing platform 301. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the embodiments is contemplated. For example, aspects of the method steps disclosed herein may be executed on a processor on a computing platform 301. Such a processor may execute computer-executable instructions stored on a computer-readable medium.

As understood by those skilled in the art, the steps that follow in the Figures may be implemented by one or more of the components in FIGS. 1, 2 and 3 and/or other components, including other computing devices.

Figure 4:
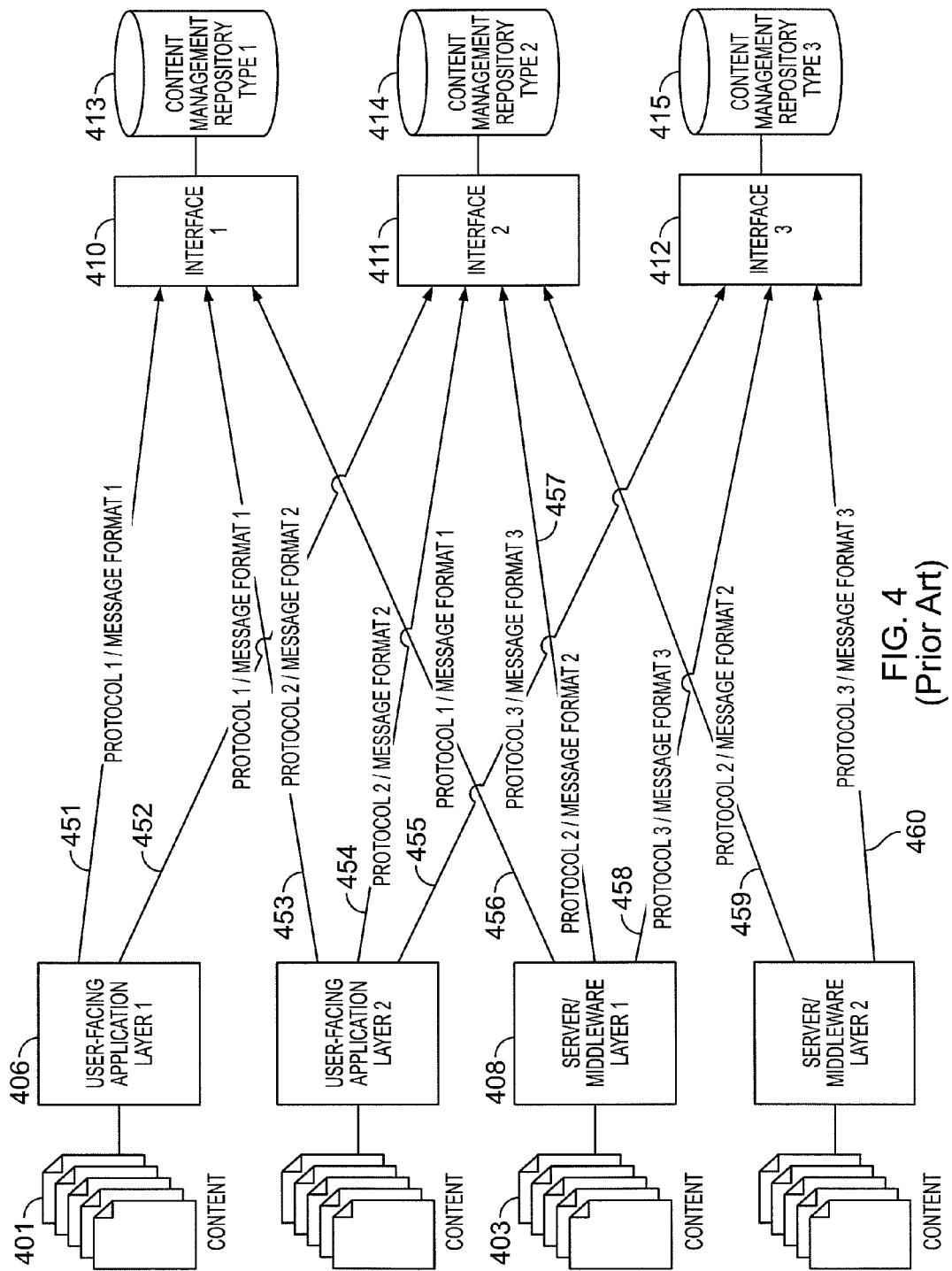
FIG. 4 shows a content management system in accordance with prior art.

FIG. 4 shows a content management system in accordance with prior art. Each user connects to content repositories through different point-to-point connections 451-460. For example, content 401 may be accessed through user-facing application layer 406 through separate point-to-point connections 451 and 452 and interfaces 410 and 411 to content repositories 413 and 414, respectively. Also, content 403 may be accessed through middleware layer 408 through point-to-point connections 456, 457, and 458 and interfaces 410, 411, and 412 to content repositories 413, 414, and 415, respectively. However, each point-to-point connection 451-460 may be associated with a different protocol-message format combination so that each user-facing application layer 406 and server/middleware layer 408-409 interacts with repositories 413-415 based on the associated point-to-point connection. Consequently, whenever a different content repository is added to a traditional enterprise system, an application or middleware (designated as a "requestor") may need to support a different protocol-message format combination.

Figure 5:
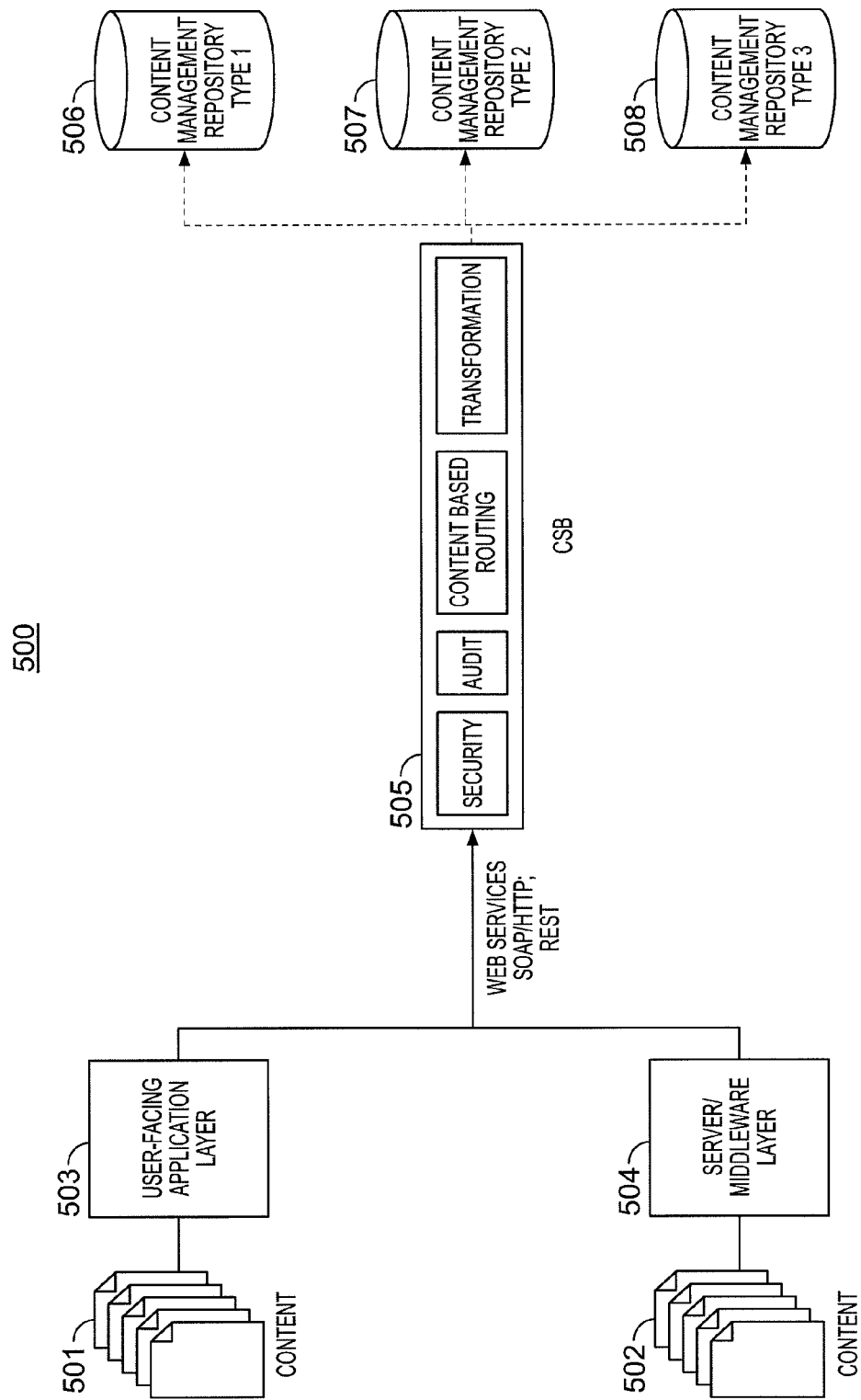
FIG. 5 shows an illustrative framework of a content service bus in accordance with various aspects of the embodiments.

FIG. 5 shows an illustrative framework 500 of a content service bus in accordance with various aspects of the embodiments. Illustrative framework 500 may support a business that manages heterogeneous content management systems and that desires to have a single interface to the different content management systems. Electronic content 501 and electronic content 502 are accessed through user-facing application layer 503 and middleware layer 504, respectively.

With an aspect of the embodiments, electronic content may be routed and stored within an enterprise via content service bus 505. Content service bus 505 may offer a distributed service-oriented architecture (SOA) platform to seamlessly route and store content to heterogeneous enterprise content management (ECM) repositories. Dynamic, on-line content may be stored, retrieved, and queried in real-time through content service bus 505, eliminating the need to have point-to-point connectivity between ECM client applications and the destination repositories and thus providing flexibility to consolidate multiple ECM platforms with minimal impacts to clients.

Illustrative framework 500 may utilize underlying technologies including Web services, intelligent routing based on content, message transformation, and federation support.

According to an aspect of the embodiments, a common business interface is supported across all repositories, including repositories 506, 507, and 508. ECM client applications may be exposed to a common, repository-agnostic interface and abstracted from a vendor-specific solution. The repository-agnostic interface may bridge an important gap, since a vendor often provides a proprietary interface to the vendor's content repository, making every integration a custom implementation According to another aspect of the embodiments, federation of content is provided across repositories 506, 507, and 508. Content from multiple repositories is served up in a consistent manner. Aggregation of data across repositories becomes seamless to clients, leading to transparency and loose coupling Illustrative framework 500 may also provide intelligent routing based on content. Parameters within client's requests are examined at run-time, to route to corresponding target systems. Similarly, responses from target systems are examined for content and transformed to the common business interface, based on request parameters as well as the nature and type of content itself.

Illustrative framework 500 may support synchronous and asynchronous operations. Clients may be provided the option of invoking the same business interface in a synchronous and asynchronous manner, leading to additional flexibility.

With another aspect of the embodiments, illustrative framework 500 may provide consistent application of security. Authentication and authorization of client's requests may be performed at this layer, eliminating the need for maintaining multiple, vendor-specific security implementations. This may also significantly reduce the risk exposure by applying consistent security policies around confidential data.

Figure 10:
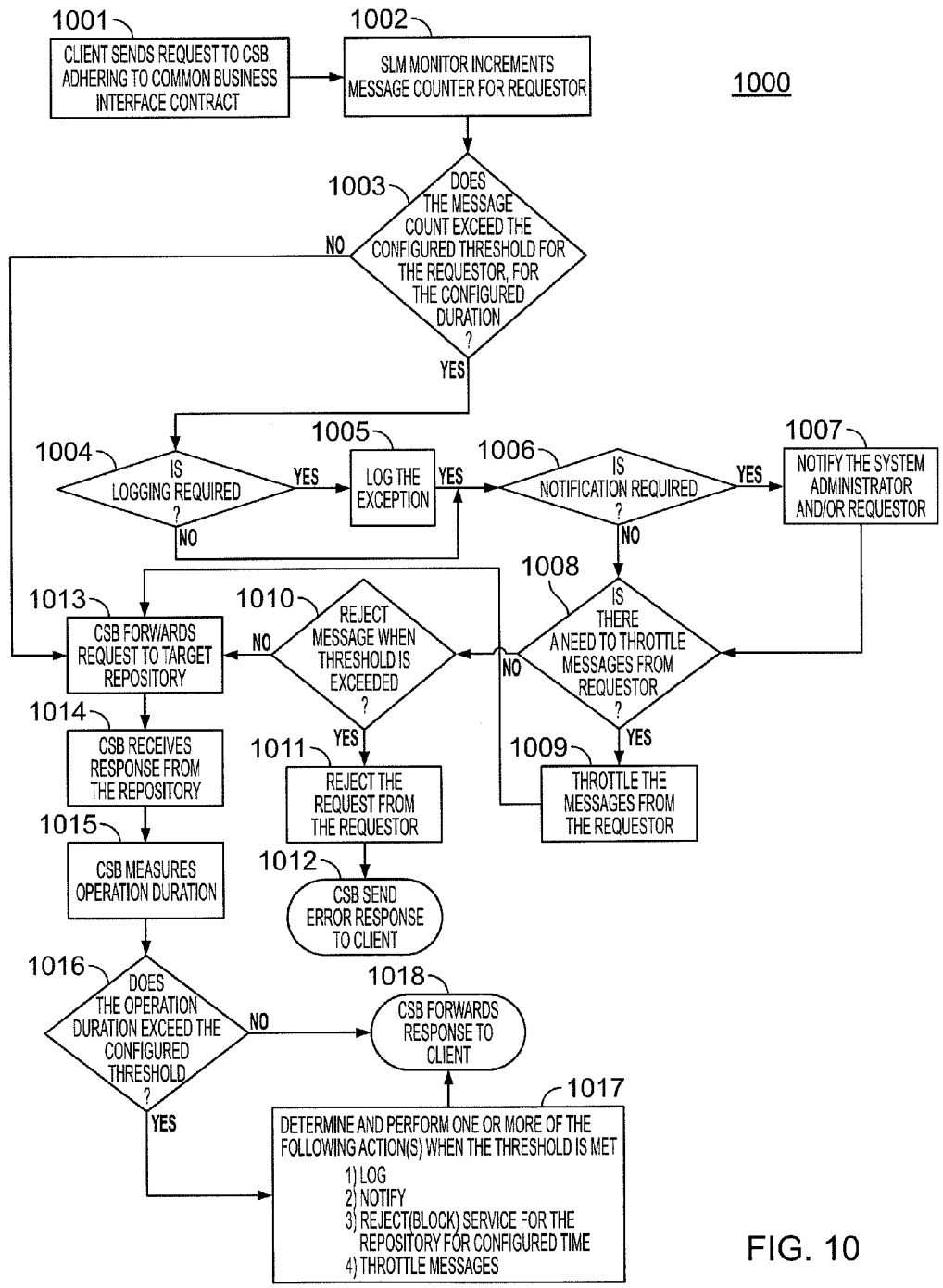
FIG. 10 shows a flow diagram for service level management with a content service bus in accordance with various aspects of the embodiments.
Figure 11:
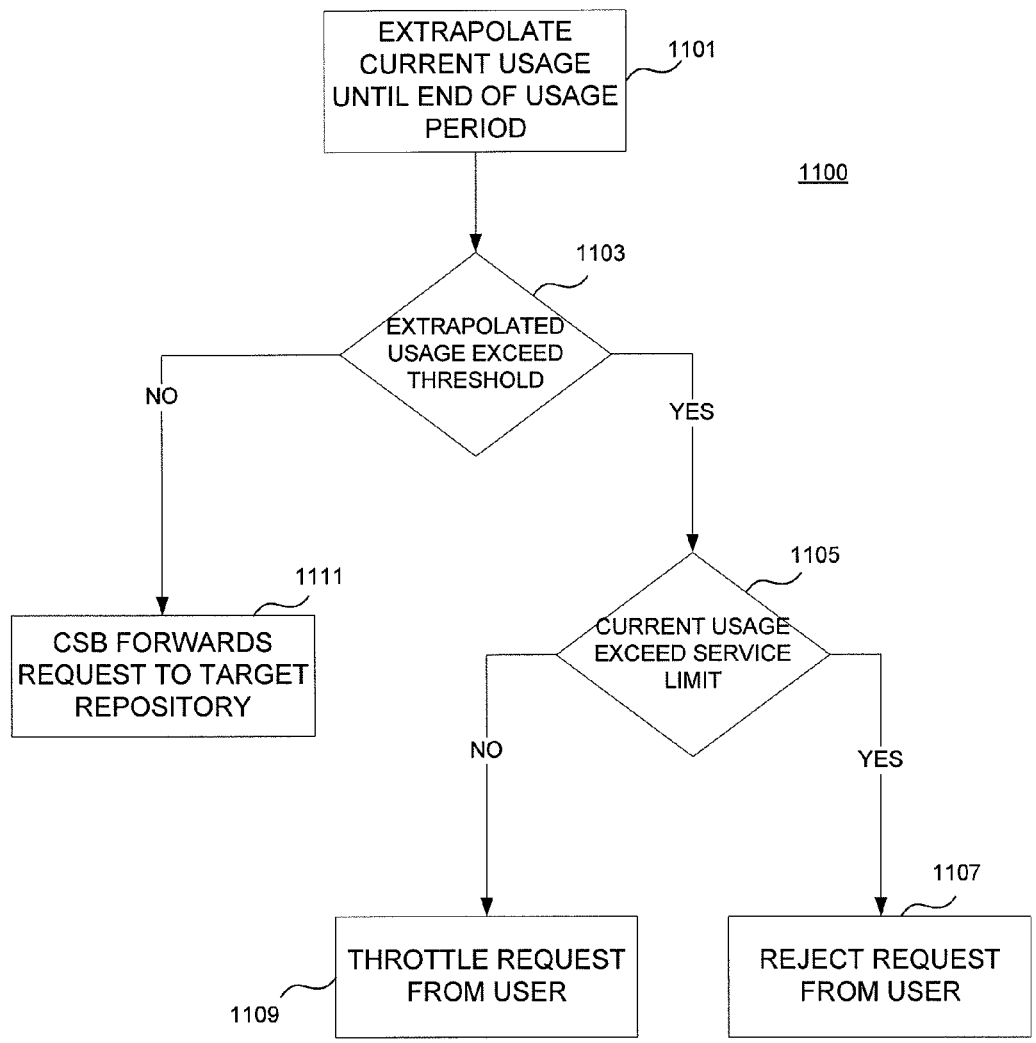
FIG. 11 shows a flow diagram for projecting usage relating to service level management in accordance with various aspects of the embodiments.

Illustrative framework 500 may also provide granular service-level management enforcement as will be further discussed with FIGS. 10 and 11. A client's requests may be monitored in real-time, and service-level agreements policies may be enforced in accordance with a service level agreement.

Referring to FIG. 1, with another aspect of the embodiments, electronic content from one or more content repositories may be migrated to another content repository, e.g., to a centralized content repository. For example, electronic content from content repository 105 may be migrated to content repository 107 so that content repository 105 can be removed from enterprise system 100. However, the migration is transparent to the requestor since content service bus 505 provides a same response to the requestor regardless whether content repository 105 or content repository 107 is responding to a request.

Illustrative framework 500 may also support legacy platform integration as shown in FIG. 2. Leveraging the CSB platform may open up the capability to interact with systems implemented using mainframe technologies as well. This capability may be a significant added value from a client's standpoint, in cases where content needs to be aggregated from both traditional ECM platforms as well as ancillary data sources.

Illustrative framework 500 may provide for a scalable, loosely coupled, dynamic and maintainable means to propagate electronic content across the enterprise that traditional systems may not support.

Figure 6:
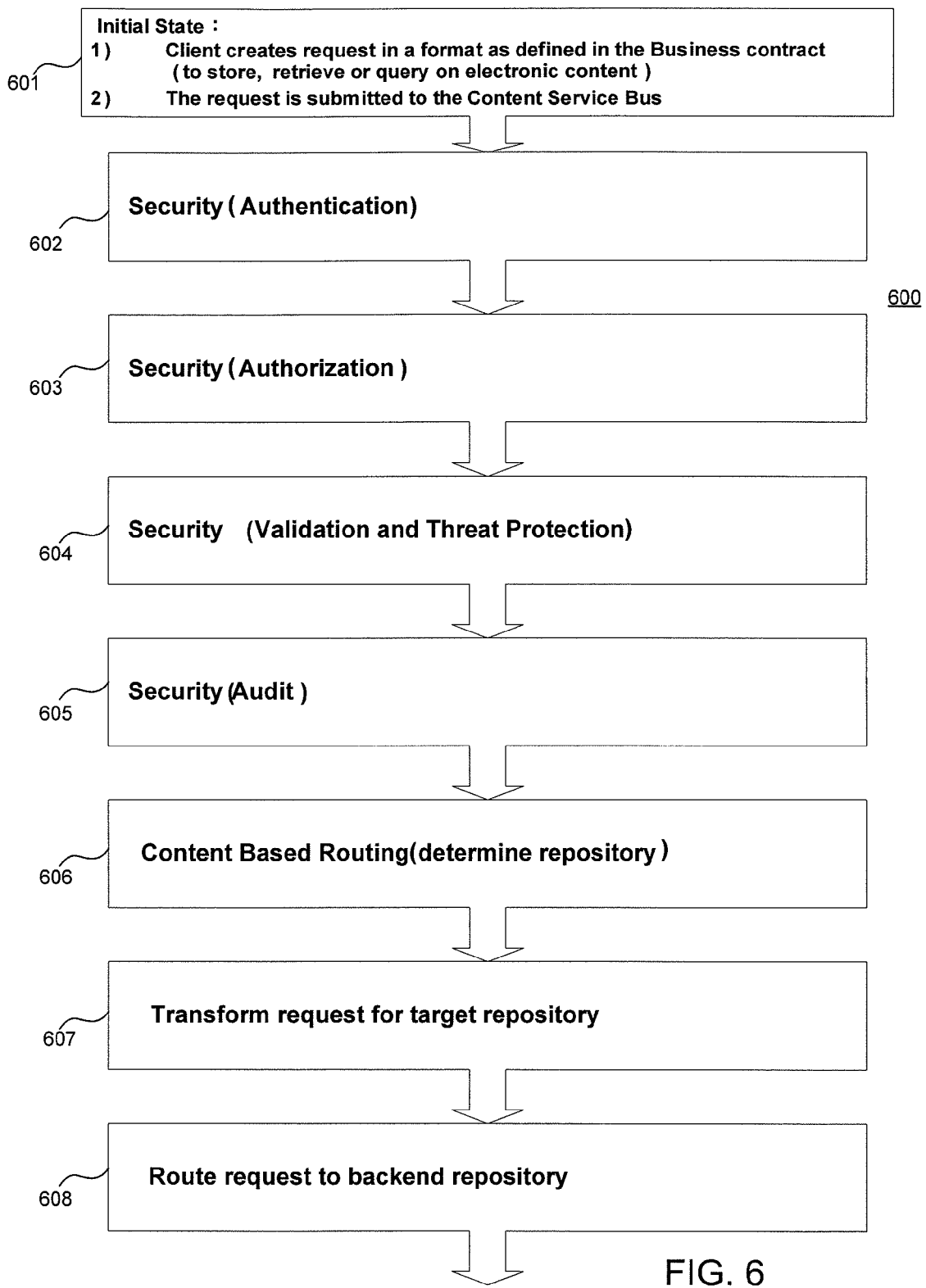
FIG. 6 shows a process diagram for a content service bus in accordance with various aspects of the embodiments.

FIG. 6 shows process diagram 600 for content service bus 505 in accordance with various aspects of the embodiments. Process flow diagram 600 illustrates how ECM clients send the requests to content service bus 505, which performs authentication, authorization, validation, threat protection, audit, content based decision to route, transformation, and forwards transformed request to a backend content repository.

At block 601 a client (e.g., application 503 or middleware 504) creates a request in a format when an end-user initiates an access request for electronic content. The request is then submitted to content service bus 505, which performs security functions, including authentication, authorization, and validation and threat protection, at blocks 602-605. Authentication and authorization of a client's request may be performed at this layer, thus eliminating the need for maintaining multiple, vendor-specific security implementations. This approach may significantly reduce the risk exposure by applying consistent security polices around confidential data.

Content service bus 505 consequently routes the access request to the appropriate content repository without explicit repository identification in the request at block 606. Content service bus 505 may utilize the attached content (e.g., a data file) as well as metadata that is about the content. For example, content service bus 505 may utilize the title, author, or group of the attached document as well as the type of content, e.g., data for a 30-year mortgage or an adjustable rate mortgage. With some embodiments, content service bus 505 maps attributes/characteristics related to the attached content and associated metadata in the access request to identify the appropriate content repository.

At block 607, content service bus 505 transforms the request to a format required by the target content repository so that a common appearance is provided to an application layer of middleware layer. In addition content service bus 505 may convert the protocol supported by the target content repository to a common protocol seen by the user. The transformed request is then routed to the determined content repository.

Figure 7:
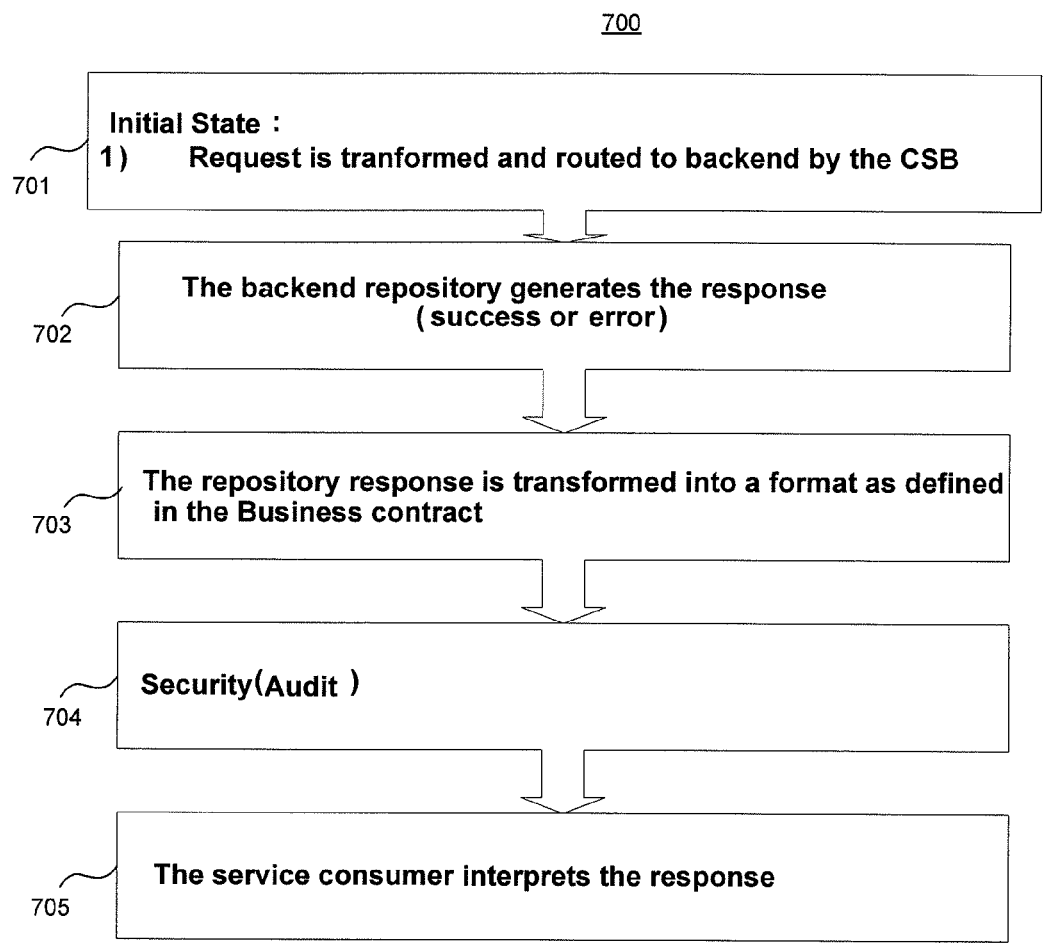
FIG. 7 shows a continuation of the process diagram shown in FIG. 6 in accordance with various aspects of the embodiments.

FIG. 7 shows process 700, which is a continuation of process 600 shown in FIG. 6 in accordance with various aspects of the embodiments. Process flow diagram 700 illustrates how response from the backend content repositories is transformed and routed back to the client.

At block 701, an access request is transformed and routed to the determined content repository corresponding to blocks 607 and 608 in FIG. 6. At block 702, the determined content repository generates a response based on the requested action, e.g., retrieving content, storing content, or querying content, which may include a status indication (success or failure) of the requested operation and requested content when content is being retrieved from the content repository. Content service bus 505 transforms the response at block 703 and performs security functions at block 704. The response is then delivered to the service consumer at block 705.

Figure 8:
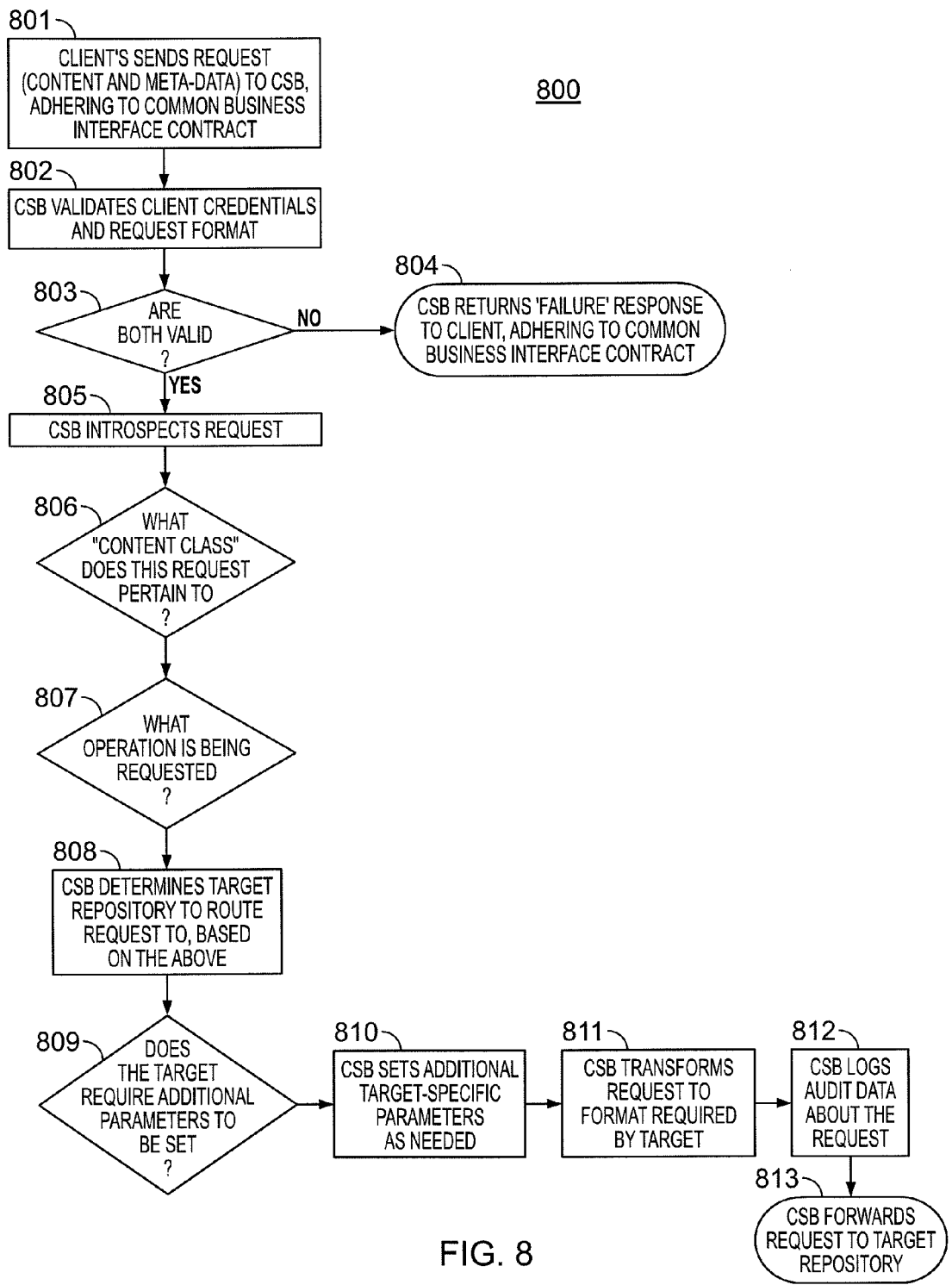
FIG. 8 shows a flow diagram for content-based routing requests with a content service bus in accordance with various aspects of the embodiments.

FIG. 8 shows a flow diagram for content-based routing requests with a content service bus in accordance with various aspects of the embodiments. At block 801, a requestor sends a request to content service bus 505 based on a common business interface contract adhering to a standard agreed upon template. Content service bus 505 may provide a transparency of the migration to the requestor by providing a repository-agnostic interface. For example, the requestor may receive the same response to a request whether the content is located on the original content repository or on the targeted content repository.

At blocks 802-804, content service bus 505 validates the client and request format based on the common business interface contract. If the request and client are validated, content service bus 505 examines the request to determine the content class at blocks 805 and 806. For example, the metadata included in the request may indicate that the content pertains to traditional residential mortgages. The request may be further analyzed at block 807 to determine the operation being requested in the request. Examples of some operations including storing content, retrieving content, updating metadata and querying on content. Content service bus then determines the target content repository where the request should be routed at block 808.

At blocks 809-810, content service bus 505 sets any additional target-specific parameters (e.g., protocol headers) in the request and transforms the request in a format required by the target content repository at block 811.

At blocks 812-813, content service bus 505 logs audit data about the request and routes the request to the target content repository. Audit data includes requestor's identity and end-to-end response time.

Figure 9:
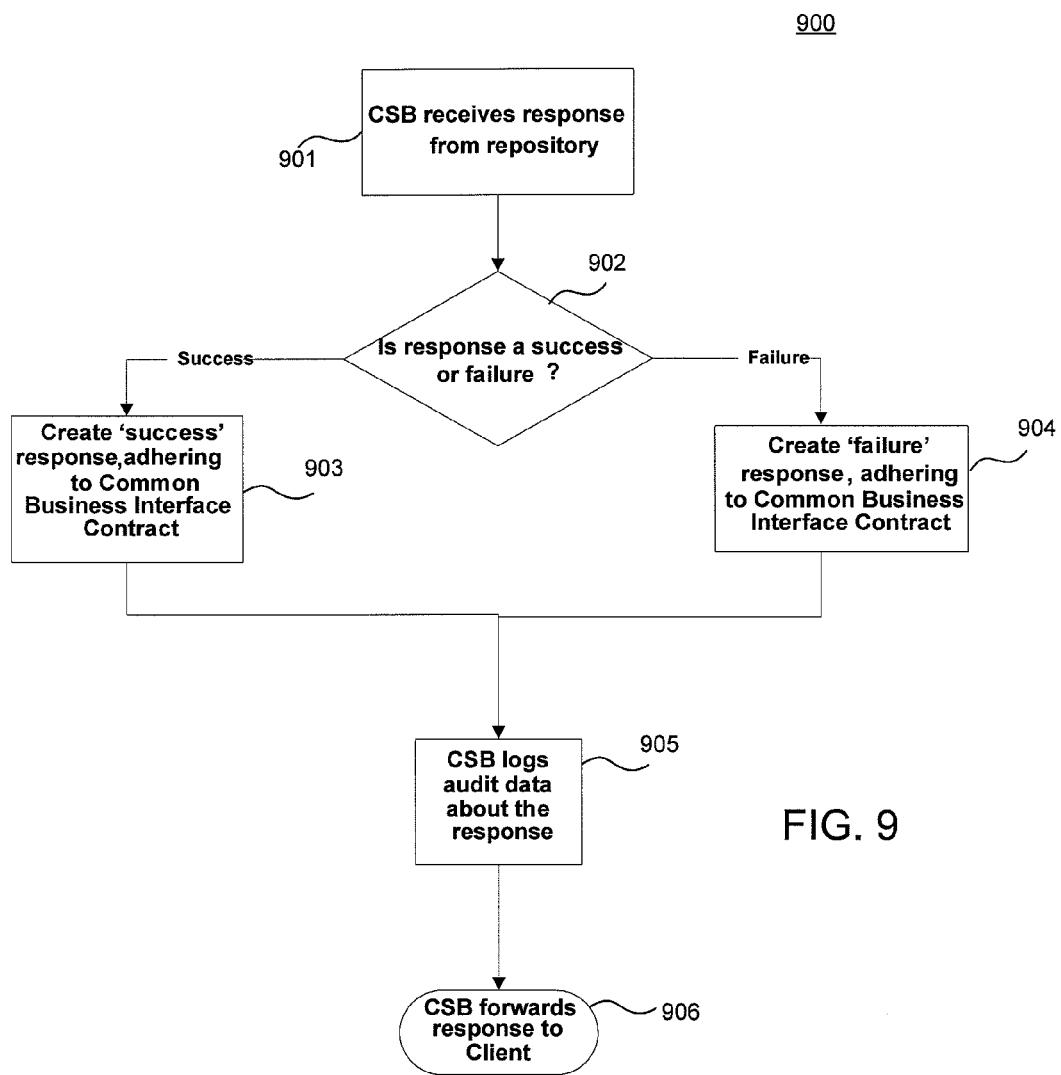
FIG. 9 shows a flow diagram for content-based routing responses with a content service bus in accordance with various aspects of the embodiments.

FIG. 9 shows flow diagram 900 for content-based routing responses with content service bus 505 in accordance with various aspects of the embodiments. In response to forwarding a request to the target content repository, as previously discussed, content service bus 505 should receive a response from the target content repository at block 901.

At block 902, content service bus 505 determines whether the response is a failure or success and creates an appropriate response at blocks 903 and 904. For example, when attached content in the request is successfully stored at the target content repository, content bus 505 indicates that the operation was successful. Content service bus 505 then logs audit data about the response at block 905 and forwards the response to the requestor at block 906.

FIG. 10 shows flow diagram 1000 for service level management with a content service bus in accordance with various aspects of the embodiments. With an aspect of the embodiments, content service bus 505 may monitor current usage for a requestor at blocks 1001-1002. Rather than waiting until the end of time period as designated in a service level agreement, content service bus 505 may monitor usage at essentially real time and anticipate whether the requestor may exceed configured usage at the end of the time period in accordance with the service level agreement at blocks 1003-1012. For example, a requestor may have initiated 50% of the allotted number of requests for the month within the first week of the month. Consequently, content service bus 505 may anticipate that the requestor may exceed the allotted limit at the current rate of usage. That being the case, content service bus 505 may throttle or reject the request.

If content service bus 505 determines to forward the request to the target content repository at block 1013, content service bus 505 should receive a corresponding response from the target content repository at block 1014. Content service bus 505 then measures the operation duration at block 1015 and determines whether the operation duration (e.g., the time duration for the target repository to respond after the request is forwarded to the target repository) exceeds a configured threshold at block 1016. (For example, the target repository may be receiving more requests than it can handle.) If not, content service bus 505 forwards the response directly to the requestor at block 1018. Otherwise, content service block 505 logs the request, notifies the requestor, rejects service for the target content repository for a configured time duration, or throttles messages at block 1017 before forwarding the response to the requestor at block 1018.

FIG. 11 shows flow diagram 1100 for projecting usage relating to service level management in accordance with various aspects of the embodiments. At block 1101, content service bus 505 extrapolates the current usage until the end of the usage period as per the service level agreement. If the extrapolated usage exceeds a predetermined threshold (e.g., a percentage of the service limit), content service bus 505 may throttle or reject the request at blocks 1107 and 1109 based on the determination at block 1105, which determines whether the current usage exceeds the service limit. Otherwise content service bus 505 forwards the request to the target content repository at block 1111.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

We claim:

1. A computer-assisted method comprising:
   receiving, by a computer system, a first request from a requestor to access electronic content without an explicit repository identification in the first request, the electronic content associated with one of a plurality of content repositories, wherein a first content repository has a first type of data interface, and wherein a second content repository has a second type of data interface different from the first type of data interface;
   routing, by the computer system, the first request to only said one of the plurality of content repositories based on data in the first request without further interaction with the requestor, wherein the data is contained in the electronic content when the first request is for storing the electronic content;
   transforming, by the computer system, the first request to a first format required by said one of the plurality of content repositories;
   determining a projected usage from current usage of the requestor by extrapolating the current usage until an end of a usage period as specified by a service level agreement for the requestor; and
   when the projected usage exceeds a predetermined threshold, determining whether to throttle the first request.

2. The method of claim 1, further comprising:
   providing an interface to the requestor that is independent of any of the plurality of content repositories.

3. The method of claim 1, further comprising:
   monitoring current usage of the requestor in real time; and
   enforcing the current usage based on a service level agreement for the requestor.

4. The method of claim 3, further comprising:
   when a message count associated with the requestor exceeds a predetermined threshold, determining whether to throttle the first request; and
   when the message count exceeds the predetermined threshold, determining whether to reject the first request.

5. The method of claim 1, further comprise:
when the current usage exceeds a service limit based on the service level agreement, rejecting the request.

6. The method of claim 1, further comprising:
migrating the electronic content from said one content repository to a different content repository; and
providing a response for a subsequent request from the requestor that is consistent with the first request.

7. The method of claim 1, further comprising:
transforming a response from said one of the plurality of content repositories to a second format required by the requestor.

8. The method of claim 1, wherein the data comprises metadata about the electronic content.

9. The method of claim 1, further comprising:
when the extrapolated usage exceeds the predetermined threshold throttling the first request.

10. A non-transitory computer-readable storage medium storing computer-executable instructions that, when executed, cause a processor to perform:
receiving a first request from a requestor to access electronic content, the electronic content associated with one of a plurality of content repositories, wherein a first content repository has a first type of data interface, and wherein a second content repository has a second type of data interface different from the first type of data interface;
routing the first request to only said one of the plurality of content repositories based on data in the first request without further interaction with the requestor, wherein the data is contained in the electronic content when the first request is for storing the electronic content;
monitoring usage of the requestor in real time;
processing the first request based on real-time usage of the requestor in accordance with a service level agreement for the requestor;
determining a projected usage from current usage of the requestor by extrapolating the current usage until an end of a usage period as specified by the service level agreement; and
when the projected usage exceeds a predetermined threshold, determining whether to throttle the first request.

11. The non-transitory computer-readable storage medium of claim 10, wherein the computer-executable instructions, when executed, cause the processor to perform:
routing the first request to only said one of the plurality of content repositories based on data in the first request without an explicit repository identification in the first request.

12. The non-transitory computer-readable storage medium of claim 11, wherein the computer-executable instructions, when executed, cause the processor to perform:
accessing said one of the plurality of content repositories for the electronic content;
providing, to the requestor, a response in a consistent manner for all of plurality of content repositories.

13. The non-transitory computer-readable storage medium of claim 12, wherein the computer-executable instructions, when executed, cause the processor to perform:
transforming the response to a second format required by the requestor.

14. The non-transitory computer-readable storage medium of claim 10, wherein the computer-executable instructions, when executed, cause the processor to perform:
when a message count associated with the requestor exceeds a predetermined threshold, determining whether to throttle the first request; and
when the message count exceeds the predetermined threshold, determining whether to reject the first request.

15. The non-transitory computer-readable storage medium of claim 10, wherein the computer-executable instructions, when executed, cause the processor to perform:
obtaining a response from said one of the plurality of content repositories;
determining whether an operation duration exceeds a configured threshold;
when the operation duration exceeds the configured threshold, perform at least one action from a set of actions, the set of actions including logging the response, notifying the requestor, throttling messages, and rejecting service for said one of the plurality of content repositories.

16. The non-transitory computer-readable storage medium of claim 10, wherein the computer-executable instructions, when executed, cause the processor to perform:
migrating the electronic content from said one content repository to a different content repository; and
providing a response for a subsequent request from the requestor that is consistent with the first request.

17. The non-transitory computer-readable storage medium of claim 10, wherein the computer-executable instructions, when executed, cause the processor to perform:
transforming the first request to a first format required by said one of the plurality of content repositories.

18. An apparatus comprising:
at least one memory; and
at least one processor coupled to the at least one memory and configured to perform, based on instructions stored in the at least one memory:
receiving a first request from a requestor to access electronic content without an explicit repository identification in the first request, the electronic content associated with one of a plurality of content repositories, wherein a first content repository has a first type of data interface, and wherein a second content repository has a second type of data interface different from the first type of data interface;
routing the first request to only said one of the plurality of content repositories based on data in the first request without further interaction with the requestor, wherein the data is contained in the electronic content when the first request is for storing the electronic content;
accessing said one of the plurality of content repositories for the electronic content;
providing, to the requestor, a response in a consistent manner for all of plurality of content repositories;
determining a projected usage from current usage of the requestor by extrapolating the current usage until an end of a usage period as specified by a service level agreement for the requestor; and
when the projected usage exceeds a predetermined threshold, determining whether to throttle the first request.

19. The apparatus of claim 18, wherein the at least one processor is further configured to perform:
transforming the first request to a first format required by said one of the plurality of content repositories.

20. The apparatus of claim 18, wherein the at least one processor is further configured to perform:
transforming the response to a second format required by the requestor.

21. The apparatus of claim 18, wherein the at least one processor is further configured to perform:

monitoring current usage of the requestor in real time; and
enforcing the current usage based on a service level agreement for the requestor.

22. The apparatus of claim 18, wherein the at least one processor is further configured to perform:

migrating the electronic content from said one content repository to a different content repository; and
providing a subsequent response for a subsequent request from the requestor that is consistent with the first request.

* * * * *